United States Patent
Mezer et al.

(10) Patent No.: US 7,823,041 B2
(45) Date of Patent: Oct. 26, 2010

(54) TECHNIQUES FOR DECODING INFORMATION FROM SIGNALS RECEIVED OVER MULTIPLE CHANNELS

(75) Inventors: Amir Mezer, Haifa (IL); Harry Birenboim, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1036 days.

(21) Appl. No.: 11/532,732

(22) Filed: Sep. 18, 2006

(65) Prior Publication Data

US 2008/0069052 A1    Mar. 20, 2008

(51) Int. Cl.
*H03M 13/00* (2006.01)
(52) U.S. Cl. .................. 714/752; 714/755; 714/786
(58) Field of Classification Search .......... 714/752, 714/755, 786
See application file for complete search history.

(56) References Cited

U.S. PATENT DOCUMENTS

| 2004/0057535 A1* | 3/2004 | Strolle et al. | 375/340 |
| 2006/0107179 A1* | 5/2006 | Shen et al. | 714/758 |

OTHER PUBLICATIONS

Gallager, R.G., "Low-Density Parity-Check Codes", IRE Transactions on Information Theory, vol. 8, Jan. 1962, pp. 21-28.

Mackay, David J.C. et al., "Near Shannon Limit Performance of Low Density Parity Check Codes", Electronics Letters, Mar. 13, 1997, vol. 33, No. 6, pp. 1-4.

Ungerboeck, Gottfried, "10GBASE-T Coding and Modulation: 128-DSQ+LDPC", IEEE P802.3an Sep./Oct. 2004 interim meeting (Sep. 2004).

* cited by examiner

*Primary Examiner*—Guy J Lamarre
(74) *Attorney, Agent, or Firm*—Glen B Choi

(57) ABSTRACT

Techniques are described herein that can be used to decode signals received over multiple channels. The received signals may be processed using noise reducing logic. Signal-to-noise ratio information per channel for signals received over each of the multiple channels may be considered to determine reliability information concerning the slicer input for each channel. Low density parity check codes or other forward error correction (FEC) codes may be used to decode the processed signals from all the multiple channels based on the reliability information.

19 Claims, 4 Drawing Sheets

TECHNIQUES FOR DECODING INFORMATION FROM SIGNALS RECEIVED OVER MULTIPLE CHANNELS

FIELD

The subject matter disclosed herein relates to techniques to decode information from signals received over multiple channels.

RELATED ART

Institute of Electrical and Electronics Engineers (IEEE) Standard 802.3an-2006 ("10GBASE-T") describes techniques for 10 Gigabit per second transmission capabilities over conventional unshielded or shielded twisted pair cables. In 10GBASE-T compliant systems, multiple channels (e.g., four) are used to provide intercommunication between transmitter and receiver. It is desirable for a receiver of signals to accurately reproduce transmitted data.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
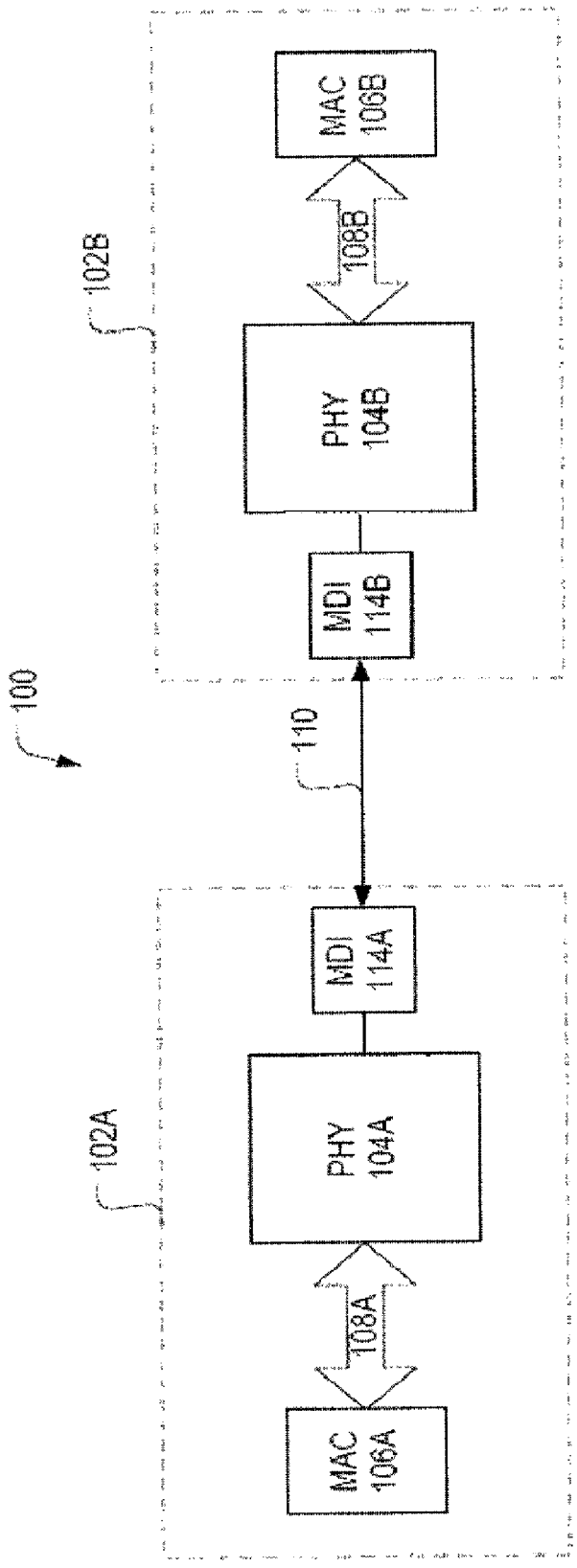
FIG. 1 provides an example system embodiment, in accordance with some embodiments of the present invention.

FIG. 1 is a block diagram of a system 100 provided in accordance with some embodiments of the present invention. System 100 may include a first network interface 102A and a second network interface 102B communicatively coupled using communication channel 110. Communication channel 110 may be implemented as any of, but not limited to: a Gigabit Ethernet cable, twisted pairs of copper wire, optic channels, wireless channels, power-line channels, acoustic/sonar channels, printed circuit board (PCB), backplanes, coaxial cable, or any other medium. For example, communication channel 110 may be Category 5, 6, 6A, or 7 network cabling and/or any other shielded or unshielded cabling. Communication channel 110 may operate at any number of bandwidths, including but not limited to 100 Mbps, 1 Gbps, 10 Gbps, and so forth.

Network interfaces 102A and 102B may each include respective physical interface (PHY) units 104A and 104B and respective media access control (MAC) units 106A and 1066.

PHY units 104A and 104B may be coupled to MAC units 106A and 106B via respective bidirectional links 108A and 108B. Although not separately indicated in the drawing, network interfaces 102A and 102B may include transceivers, hybrids, digital signal processors, and other components. In one embodiment, PHY units 104A and 104B may include transceivers and hybrids, for example, and MAC units 106A and 106B may be implemented with a digital signal processor or other logic.

In one embodiment, PHY units 104A and 104B may include respective receivers. Each receiver may include an adaptive digital interference canceller and an equalizer module, for example. Receivers may be configured such that the adaptive interference cancellers may be adapted in accordance with the various embodiments of adaptation techniques or processes described herein. For, example in one embodiment, adaptive interference canceller adaptively filters a noise reference input to maximally match and subtract out noise or interference from a primary input signal. In various embodiments, network interfaces 102A and 102B may be part of a computer system and may be coupled to a general purpose processor to which other components such as volatile and non-volatile memory devices, mass storage, and input/output devices may be coupled or may be implemented using other logic. In various embodiments, the computer system may include a user interface such as a keyboard as well as a display device.

Network interfaces may allow devices coupled thereto to communicate information over a network. In various embodiments, network interfaces 102A and 102B may represent any network interface suitable for use with a number of different Ethernet techniques as defined by the Institute of Electrical and Electronics Engineers (IEEE) 802.3 series of standards. For example, network interfaces 102A and 102B may include logic capable to operate in accordance with the IEEE 802.3-2005 standard. The IEEE 802.3-2005 standard defines 1000 megabits per second (Mbps) operations (1000BASE-T) using four pair twisted copper Category 5 wire, 10 Gbps operations using fiber cable, and 10 Gbps operations (10GBASE-CX4) using copper twin axial cable (collectively referred to herein as "Gigabit Ethernet"). More particularly, network interfaces 102A and 102B may include logic capable to operate in accordance with the IEEE Standard 802.3-2005 titled "IEEE Standard For Information Technology—Telecommunications and information exchange between systems—Local and metropolitan networks—Specific requirements Part 3: Carrier Sense Multiple Access with Collision Detection (CSMA/CD) Access Method and Physical Layer Specifications, Amendment: Ethernet Operation over Electrical Backplanes," Draft Amendment P802.3ap/Draft 2.1, 2005 ("Backplane Ethernet Specification"). Network interfaces 102A and 102B, however, are not necessarily limited to the techniques defined by these standards, and network interfaces 102A and 102B may use other techniques and standards as desired for a given implementation. The embodiments are not limited in this context.

Network interfaces 102A and 102B may include logic capable to operate in accordance with the IEEE Proposed Standard 802.3an titled "IEEE Standard For Information Technology—Telecommunications and information exchange between systems—Local and metropolitan networks—Specific requirements Part 3: Carrier Sense Multiple Access with Collision Detection (CSMA/CD) Access Method and Physical Layer Specifications: Amendment: Physical Layer and Management Parameters for 10 Gb/s Type 10GBASE-T," Draft Amendment P802.3an/Draft 4.0, 2006 and revisions thereof (hereafter, "10GBASE-T Specification"). Embodiments of network interface 102A and 102B, however, are not necessarily limited to the techniques defined by these standards, and network interfaces 102A and 102B may use other techniques and standards as desired for a given implementation. The embodiments are not limited in this context.

As shown in FIG. 1, network interfaces 102A and 102B may include respective MAC units 106A and 106B and PHY units 104A and 104B. In various embodiments, MAC units 106A and 106B and/or PHY units 104A and 104B may be capable to operate in accordance with one of the Ethernet architectures as previously described, such as the IEEE 802.3-2005 series of standards as well as the 10GBASE-T Specification and/or Backplane Ethernet Specification.

In one embodiment, for example, MAC units 106A and 106B and/or PHY units 104A and 104B may be capable to operate in accordance with the 10GBASE-T Specification and/or the Backplane Ethernet Specification, for example. Backplane Ethernet combines the IEEE 802.3 MAC and MAC Control sublayers with a family of Physical Layers defined to support operation over a modular chassis backplane. Backplane Ethernet supports the IEEE 802.3 MAC operating at 1000 Mbps and/or 10 Gbps. For 1000 Mbps operation, the family of 1000BASE-X PHY signaling systems is extended to include 1000BASE-KX. For 10 Gbps operation, two PHY signaling systems are defined. For operation over four logical lanes, the 10GBASE-X family is extended to include 10GBASE-KX4. For serial operation, the 10GBASE-R family is extended to include 10GBASE-KR (e.g., using various serializer/deserializer or "SERDES" techniques). Backplane Ethernet also specifies an Auto-Negotiation function to enable two devices that share a backplane link segment to automatically select the best mode of operation common to both devices.

With reference to the seven-layer Open System Interconnect ("OSI") Reference Model developed by the International Standards Organization ("ISO"), MAC units 106A and 106B may perform MAC layer operations. The MAC layer is a sublayer of the data link layer. The data link layer is primarily concerned with transforming a raw transmission facility into a communication line free of undetected transmission errors for use by the network layer. The data link layer may accomplish this task by breaking input data into data frames, transmitting the data frames sequentially, and processing acknowledgement frames. The MAC sublayer may provide additional functionality concerned with controlling access to broadcast networks (e.g., Ethernet). In the case of Ethernet architecture, for example, the MAC sublayer may implement a CSMA/CD protocol.

In various embodiments, MAC units 106A and 106B are coupled to respective PHY units 104A and 104B via respective bi-directional links 108A and 108B to provide data paths between MAC units 106A and 106B and respective PHY units 104A and 104B. Bi-directional links 108A and 108B are often referred to as a Media Independent Interface ("MII"), an xMII in the case of implementations of 100 Mbps or higher, X attachment unit interface ("XAUI") in the case of 10 Gbps implementations, or X fiber interface ("XFI") in the case of dual path 10 Gbps implementations. In one embodiment, for example, bi-directional links 108A and 108B may be implemented as a 10 Gbps MII (XGMII) when MAC units 106A and 106B and/or PHY units 104A and 104B are implemented for serial operations in accordance with 10GBASE-KR as defined by the Backplane Ethernet Specification. Bi-directional links 108A and 108B may use a 4-octet wide data path, for example, when implemented as an XGMII bi-directional link. In one embodiment, for example, bi-directional links 100A and 108B may comprise a XAUI link where the XGMII from MAC units 106A and 106B is extended through a XGXS sublayer (e.g., XGMII extender sublayer) which provides XGMII on both sides with XAUI used there between to extend it. The embodiments are not limited in this context.

In various embodiments, PHY units 104A and 104B are capable to perform physical layer operations. The physical layer is primarily concerned with transmitting raw bits over physical medium, e.g., communication channel 110 physical medium, which may be some form of network. PHY units 104A and 104B are coupled to communication channel 110 via respective media dependent interfaces (MDI) units 114A and 114B, for example. In the four pair twisted conductor embodiment, PHY units 104A and 104B convert digital data received from respective MAC units 106A and 106B (e.g., 1000BASE-X or 10GBASE-X) into analog symbols (e.g., 1000BASE-T or 10GBASE-T Specification) for transmission over communication channel 110. For example, PHY units 104A and 104B may encode the digital data using Manchester encoding or the like.

For 10GBASE-T Specification compliant systems, the received signal may include payload bits encoded in accordance with 128 double square (DSQ) symbols modulation, have low density parity check (LDPC) coding applied, mapped using pulse amplitude modulation (PAM) symbols (e.g., 16 levels), and/or have Tomlinson-Harashima precoding applied, although other encoding schemes may be used. For example, for a 1000BASE-T compliant receiver, the received signal may be encoded using pulse amplitude modulation (PAM) 5 encoding for modulation and an forward error correction (FEC) code of the Trellis Coding Modulation (TCM). Logic may decode such signals according to the appropriate decoding schemes.

In various embodiments, PHY units 104A and 104B may further include logic capable to perform operations for various sublayers of the physical layer, including a physical coding sublayer ("PCS"), a physical medium attachment ("PMA") sublayer, and a physical medium dependent ("PMD") sublayer. In one embodiment, for example, PHY units 104A and 104B may perform FEC operations for the various sublayers, such as used between the PMA sublayer and PCS sublayer, for example.

In some embodiments, although not depicted, either or both of PHY units 104A and 104B may be communicatively coupled to another device using a medium similar to that of channel 110.

In some embodiments, either or both of PHY units 104A and 104B include the capability to determine characteristics of signals received in each of multiple channels. The information may include signal to noise ratios for each of the channels. The information may be used to determine metrics such as but not limited to reliabilities of the coded bits at a slicer input. LDPC decoding may take place based on the metrics as inputs.

Figure 2:
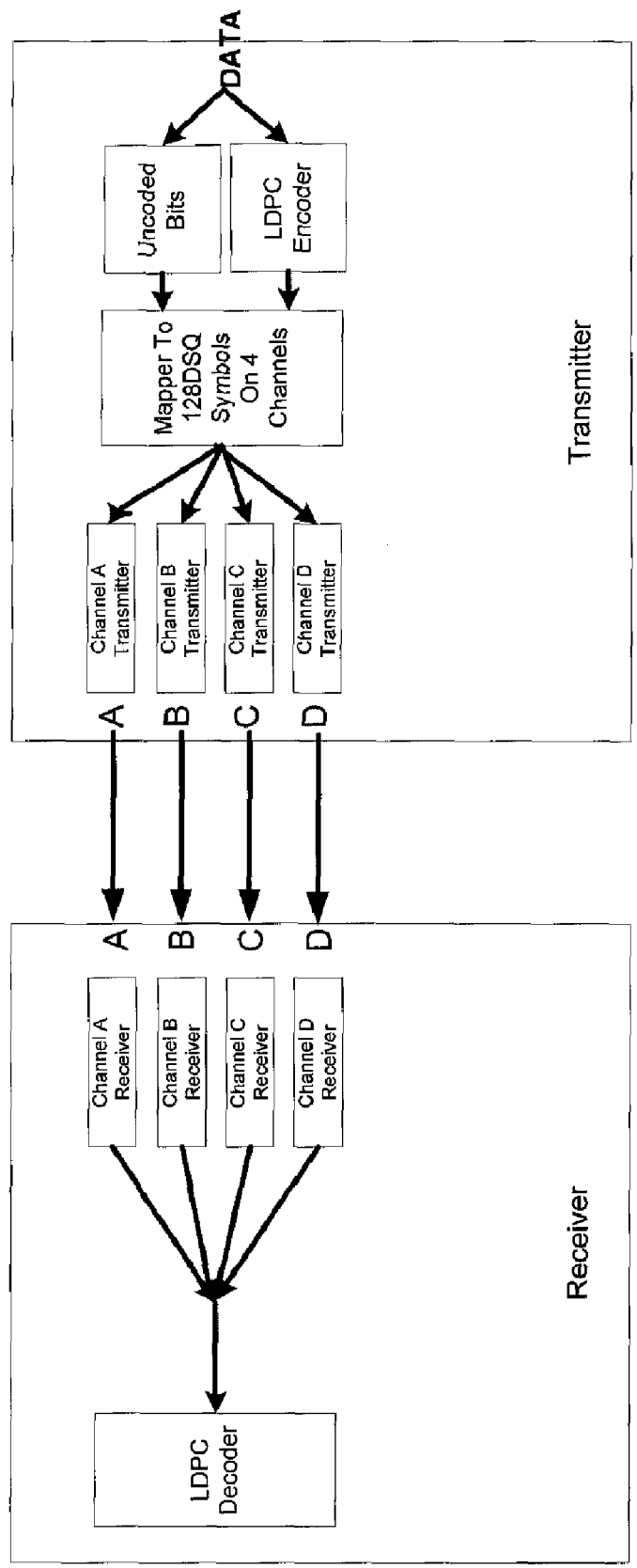
FIG. 2 shows a high-level depiction of a possible 10GBASE-T compliant system, in accordance with some embodiments of the present invention.

FIG. 2 shows a high-level depiction of a possible 10GBASE-T Specification compliant system, in accordance with some embodiments of the present invention. 10GBASE-T Specification compliant systems can be symmetrical, so each side includes the capability to simultaneously transmit and receive. In the transmitter, an LDPC encoder produces data which is mapped onto the four physical channels (shown as A-D). In the receiver, each of the separate channels has its own receiver and provides its best estimation of the received signal.

Figure 3:
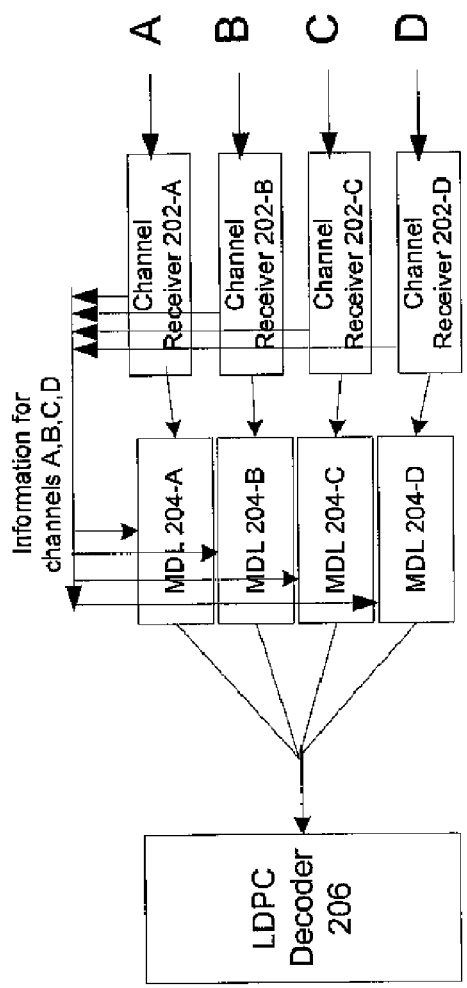
FIG. 3 provides an example of a receiver, in accordance with some embodiments of the present invention.

FIG. 3 provides an example of a receiver, in accordance with some embodiments of the present invention. The receiver can be used in a 10GBASE-T Specification compliant transceiver with the capability to simultaneously transmit and receive. However, transceivers compliant with other standards may use the receiver of FIG. 3 such as but not limited to 1000BASE-T and/or 10GBASE-CX4 (both described in IEEE 802.3-2005). For example, a network medium to provide intercommunication between a transmitter (not depicted) and at least one of the channels A-D of the receiver may at least be a Category 5, 6, 6A, or 7 network cabling and/or any other shielded or unshielded cabling. In some embodiments, network medium may be any type of medium such as but not limited to twisted pairs of copper wire, optic channels, wireless channels, power-line channels, acoustic/sonar channels, printed circuit board (PCB), backplanes, coaxial cable, or any other communications medium.

In some embodiments, the receiver may include a channel receiver for each of channels A-D (shown as respective channel receiver 202-A to 202-D). Each channel receiver may at least include equalizer logic to reduce inter-symbol interference (ISI), as well as disturber noise cancellation logic, timing recovery logic, and slicer logic (or other noise reducing and decision logic). Each channel receiver may provide sufficient performance, so that, in conjunction with LDPC decoder 206, the receiver meets the required bit error rate (BER) (e.g., 1e-12 for 10GBASE-T Specification) for any operating condition defined by a relevant standard. Logic to reduce inter-symbol interference (ISI) may be implemented as an adaptive finite impulse response (FIR) filter with coefficients adapted to reduce ISI. Disturber noise cancellation logic may perform noise cancellation such as but not limited to echo cancellation, near-end cross talk cancellation (NEXT), and/or far-end cross talk cancellation (FEXT). Timing recovery logic may re-time signals to reduce jitter in received signal and to provide signals according to a clock signal used by the receiver.

Two consecutive inputs to a slicer for each channel may be an estimated 128DSQ symbol with residual noises. The slicer may convert the input into soft decision symbols. A soft decision symbol may be a high resolution format of a combination of a decision symbol (e.g., coded PAM 16 symbols) and a representation of noise. For example, after reducing noise in the input signal, slicer logic may provide a soft decision symbol to LDPC decoder 206. Some implementations of the slicer logic may include an equalizer.

In conventional systems, inputs from multiple channels to the LDPC decoder are always assumed jointly to be at a specific signal-to-noise ratio (SNR). However, there can be large variation in SNR among at least two channels, if not more. According to some embodiments of the present invention, each of channel receivers 202-A to 202-D may provide information at least of the SNR of signals received in its channel. Such information from each of receiver 202-A to 202-D may be used by respective metric determination logic (MDL) 204-A to 204-D for its channel to adjust metrics associated with its channel. For example, metric determination logic 204-A to 204-D may be associated with each of channels A-D.

The SNR may include an estimation of the average SNR. The SNR may be estimated as average signal power divided by average noise power during the last N symbols, where N is an integer. Techniques for determining the average signal power may include determining a moving average or performing a leaky averaging. Because the average signal power in the 10GBASE-T Specification is approximately constant over time and among all channels, the information used is the average noise root-mean-square (RMS), also known as "$\sigma$". The average noise power may be the average of the error, where the error is defined as the difference between the slicer logic input and the slicer logic output (i.e., decision).

Metrics determined by metric determination logic for each channel may include reliabilities of the coded bits at the slicer input. Two consecutive slicer inputs may be an estimated 128DSQ symbol with residual noise. On each channel, a pair of symbols may refer to two consecutive PAM 16 symbols at 800 MHz and represent one 128DSQ symbol. A 128DSQ symbol may include 4 coded bits and 3 uncoded bits, as described on pages 3 and 8-10 of "10GBASE-T Coding and Modulation: 128-DSQ+LDPC", Ungerboeck (2004) (hereafter "Ungerboeck"). Metrics for the 4 coded bits may be determined based on the signal-to-noise ratio for each of the channels as described in pages 11-12 of Ungerboeck. Generally speaking, at high SNRs, the closer the slicer input is to the slicer output (decision of the slicer), the higher the reliability. Metrics may be determined using numerous methods. One technique for determining metrics is the Log-Likelihood Ratio (LLR) of the aposteriori probabilities of the bits associated with the LDPC decoder input. Metrics may be unitless.

In some embodiments, each of metric determination logic 204-A to 204-D may determine the metrics for each channel while normalizing the metrics according to the average noise RMS of each channel. In some embodiments, a look-up-table of metrics providing the optimal metrics for each SNR may be stored and accessible by at least one of metric determination logic 204-A to 204-D. The metrics may be quantized to discrete steps, e.g. 0.5 dB or other number of steps.

For example, on symbols provided by slicer logic for each channel, LDPC decoder 206 may perform parity check nodes processing, bit nodes processing, uncoded bit extraction, and/or decoding in accordance with low-density parity-check codes. For example, low-density parity-check codes is described at least in R. G. Gallager, "Low-density parity-check codes," IRE Trans. Inform. Theory, vol. 8, pp. 21-28, January 1962 (hereafter "Gallager"). For example, LDPC decoder 206 may use any or a combination of the following schemes: Maximum Aposteriori Probability, Bahl Cocke Jelinek and Raviv, Uniformly Most Powerful, and/or Sum-Product Algorithm. LDPC decoder 206 may output hard decision symbols that may include data as well as other information described in 10GBASE-T Specification. In some embodiments, other forward-error correction (FEC) coding schemes may be used instead of or in addition to LDPC. Data as well as other information may be used by applications of a host system or other device such as but not limited to electronic mail or internet website content.

LDPC decoder 206 may include an iterative decoder. LDPC decoding may use metrics provided by each of metrics determination logic 204A to 204-D. "Near-Shannon Limit Performance Of Low Density Parity Check Codes", D. J. C. MacKay and R. M. Neal, Electronics Letters, 13 Mar. 1997, Vol. 33, No. 6 may describe techniques by which metrics can be used to perform LDPC decoding. Using the SNR information of each of the channels may improve reliability of metrics. Providing higher reliability metrics to LDPC decoder 206 may reduce the number of iterations performed by LDPC decoder 206 to achieve a desired BER. For example, the desired BER may be stated in 10GBASE-T Specification, as well as other utilized standards. Reducing the number of iterations may result in reduced power consumption. Providing higher reliability metrics to LDPC decoder 206 may result in a lower final BER. Because LDPC decoder 206 operates with better metrics, it is able to decode the message in less iterations. During decoding, after each iteration, parity checks are performed on the assumed decoded message at that stage. If the parity checks result in "0", i.e. there are no detectable errors, then no additional iteration is performed.

Metrics of multiple channels may be combined to produce inputs to LDPC decoder 206. The following is an illustration of how 2048 metrics may be collected: AA provides metrics for the first 4 bits, BB provides 4 additional metrics, CC provides 4 additional metrics, DD provides 4 additional metrics, AA provides 4 additional metrics, BB provides 4 additional metrics and so forth until 2048 metrics are collected. AA represents two consecutive PAM 16 symbols at the slicer input of channel A and likewise for BB-DD. LDPC decoding of the whole frame may begin at collection of 2048 metrics. At the end of the decoding process, 1723 (estimated) message bits are obtained. 10GBASE-T Specification provides details on the LDPC framing inside the whole data stream.

Figure 4:
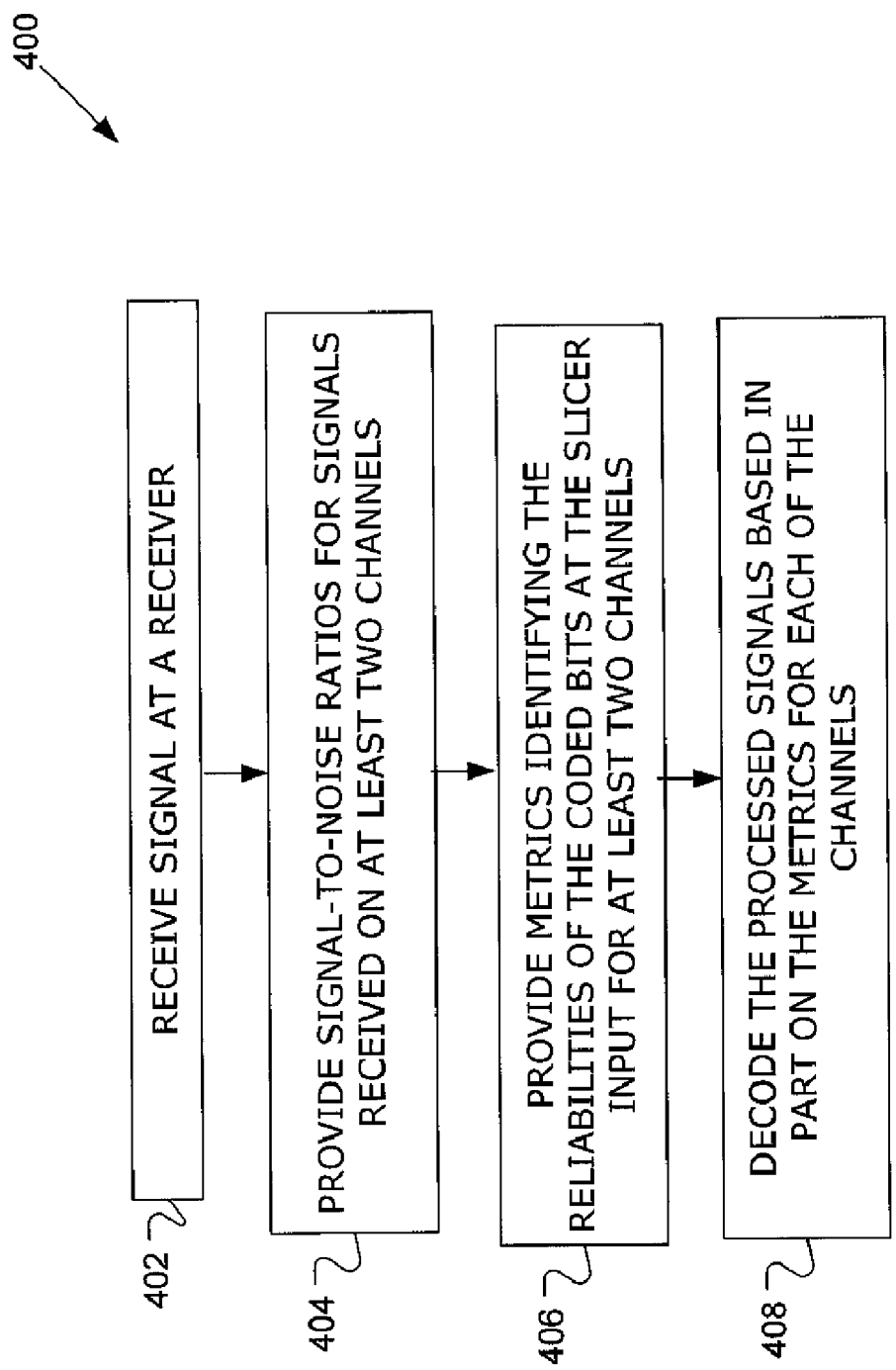
FIG. 4 provides a flow diagram of a process, in accordance with some embodiments of the present invention.

FIG. 4 provides a flow diagram of a process in accordance with some embodiments of the present invention. Block 402 may include receiving a signal at a receiver. For example, the signals may be encoded in accordance with the 10GBASE-T Specification, although other standards may be used. For example, the received signal may include payload bits encoded in accordance with LDPC, mapped using pulse amplitude modulation (PAM) symbols (e.g., 16 levels), and/or have Tomlinson-Harashima precoding applied.

Block 404 may include providing signal-to-noise ratios for signals received from all of the channels after processing by a channel receiver. The processing may include at least one of inter-symbol interference reduction, noise reduction, re-timing, and slicing.

Block 406 may include providing metrics identifying the reliabilities of the coded bits at the slicer inputs for each of the channels. For example, a "channel" may refer to a pair of copper wires or other network media. The slicer input may be an estimated 128DSQ symbol with residual noises.

Block 408 may include decoding the processed signals based on the metrics for each of the channels. For example, decoding may include at least one of: parity check nodes processing, bit nodes processing, uncoded bit extraction, and/or decoding in accordance with low-density parity-check codes. Data and other information transmitted by a transmitter may be provided in block 408.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
receiving signals in each of multiple channels;
processing the signals, wherein the processing includes at least reducing noise in the signals;
providing information at least of the signal-to-noise ratio of noise-reduced signals of each of multiple channels;
providing metrics of noise-reduced signals for each of the channels based on the signal-to-noise ratio of noise-reduced signals of each of multiple channels independent of signal-to-noise ratio of another channel, wherein metrics describe reliability of inputs used in the act of reducing noise,
providing metrics comprises determining a Log-Likelihood Ratio of aposteriori probabilities of coded bits in the noise-reduced signals using signal-to-noise ratio of each channel, and
providing metrics comprises providing metrics from a look-up-table using signal-to-noise ratio of the channel; and
decoding each of the noise-reduced signals based on a combination of the metrics from the multiple channels.

2. The method of claim 1, wherein the multiple channels includes at least two channels.

3. The method of claim 1, wherein the multiple channels comprise two or more twisted pairs of copper cabling.

4. The method of claim 1, wherein the signals are compliant at least with electrical characteristics of a 10GBASE-T Specification.

5. The method of claim 1, wherein the processing comprises processing based on estimated 128 double square symbols with residual noises.

6. The method of claim 1, wherein the processing comprises performing slicing.

7. The method of claim 6, wherein the processing further comprises:
reducing inter-symbol interference;
reducing at least one of cross talk noise and echo-related noise; and
performing signal retiming.

8. The method of claim 1, wherein decoding each of the noise-reduced signals comprises using low-density parity-check codes.

9. The method of claim 1, wherein decoding each of the noise-reduced signals comprises using Forward Error Correction.

10. An apparatus comprising:
logic to receive signals in each of multiple channels;
logic to process the signals, wherein logic to process the signals includes logic to reduce noise in the signals and wherein the logic to reduce noise comprises slicer logic;
logic to provide information at least of signal-to-noise ratio of noise-reduced signals of each of multiple channels;
logic to provide metrics of noise-reduced signals for each of the channels based
on the signal-to-noise ratio of noise-reduced signals of each of multiple channels, wherein metrics describe reliability of inputs by the slicer logic and to provide metrics, the logic is to determine a Log-Likelihood Ratio of aposteriori probabilities of coded bits in the noise-reduced signals using signal-to-noise ratio of each channel and retrieve metrics from a look-up-table based in part on a signal-to-noise ratio of each channel; and
logic to decode each of the noise-reduced signals based on the metrics.

11. The apparatus of claim 10, wherein logic to process the signals comprises:
logic to reduce inter-symbol interference;
logic to reduce at least one of cross talk noise and echo-related noise; and
logic to perform signal retiming.

12. The apparatus of claim 10, wherein the inputs to the slicer logic comprise estimated 128 double square symbol with residual noises.

13. The apparatus of claim 10, wherein the logic to decode comprises logic to perform at least one of parity check nodes processing, bit nodes processing, uncoded bit extraction, and forward error correction, and decoding in accordance with low-density parity-check codes.

14. The apparatus of claim 10, wherein the signals comply at least with electrical characteristics of 10GBASE-T Specification.

15. A system comprising:
a network medium; and
a receiver capable to decode signals compliant with 10GBASE-T Specification and communicatively coupled to the network medium, wherein the receiver comprises:
logic to receive signals in each of multiple channels,
logic to process the signals, wherein logic to process the signals includes logic to reduce noise in the signals and wherein the logic to reduce noise comprises slicer logic,
logic to provide information at least of signal-to-noise ratio of noise-reduced signals of each of multiple channels,
logic to provide metrics of noise-reduced signals for each of the channels based on the signal-to-noise ratio of noise-reduced signals of each of multiple channels, wherein
metrics describe reliability of inputs by the slicer logic and
to provide metrics, the logic is to determine a Log-Likelihood Ratio of aposteriori probabilities of coded bits in the noise-reduced signals using signal-to-noise ratio of each channel and retrieve metrics from a look-up-table based in part on a signal-to-noise ratio of each channel, and
logic to decode each of the noise-reduced signals based on the metrics.

16. The system of claim 15, wherein the network medium comprises at least one of Category 5, 6, 6A, or 7 network cabling, shielded, and unshielded cabling.

17. The system of claim 15, further comprising a media access controller communicatively coupled to the receiver.

18. The system of claim 15, further comprising a computer system communicatively coupled to the receiver.

19. The system of claim 15, further comprising a transmitter to transmit the signals to the receiver.

* * * * *